(No Model.)
J. C. PEQUINOT.
SCRAPER.
No. 385,003. Patented June 26, 1888.
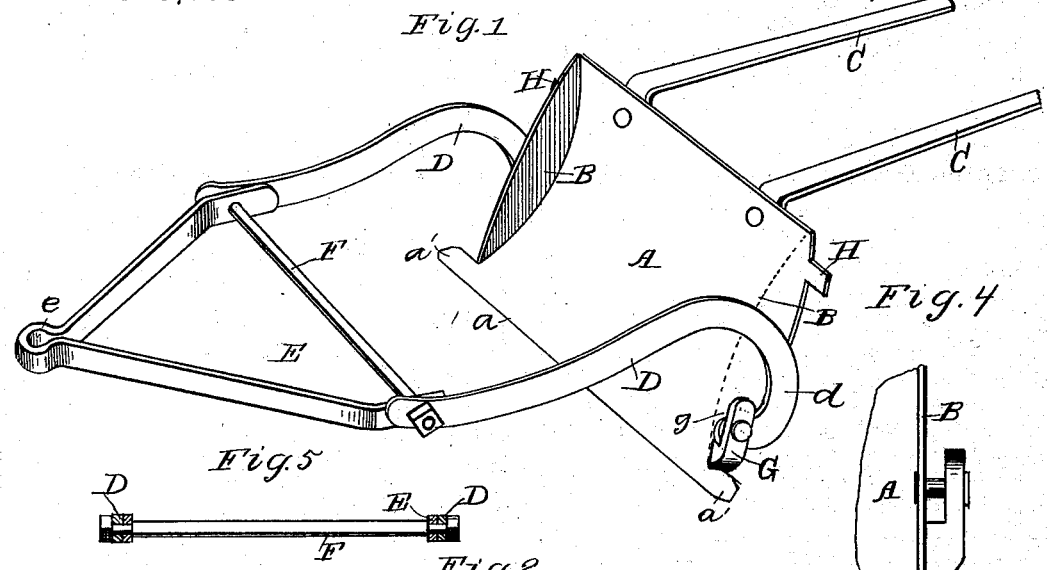
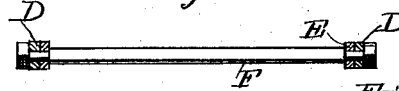
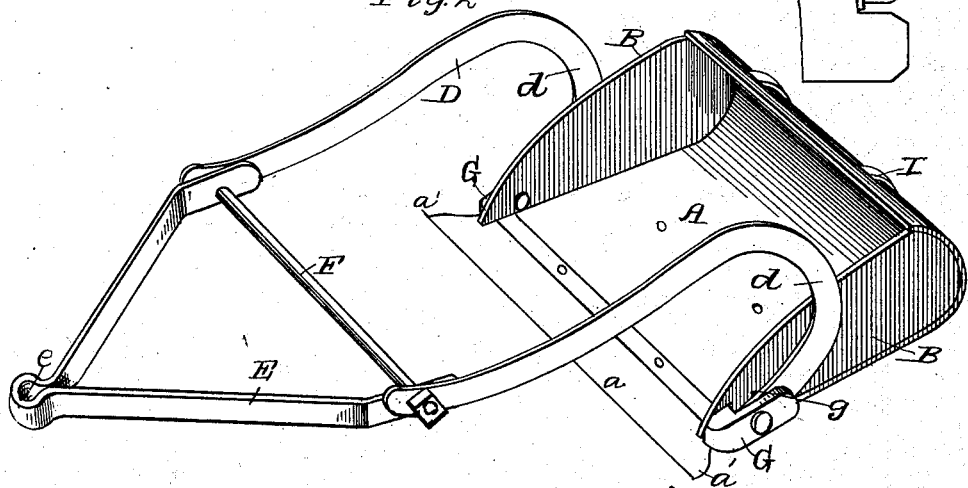
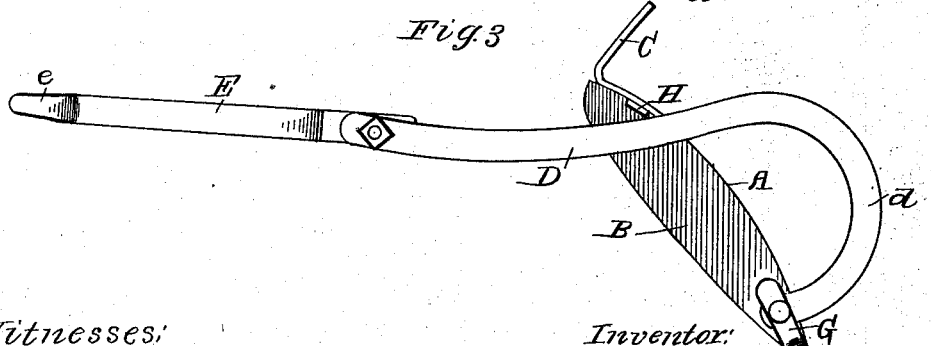
Witnesses:
J. C. Turner
L. M. Fox
Inventor:
Joseph C. Pequinot

UNITED STATES PATENT OFFICE.

JOSEPH C. PEQUINOT, OF FORT WAYNE, INDIANA.

SCRAPER.

SPECIFICATION forming part of Letters Patent No. 385,003, dated June 26, 1888.

Application filed July 15, 1887. Serial No. 244,369. (No model.)

*To all whom it may concern:*

Be it known that I, JOSEPH C. PEQUINOT, a citizen of the United States, residing at Fort Wayne, in the county of Allen and State of Indiana, have invented certain new and useful Improvements in Scrapers, of which the following is a specification, reference being had therein to the accompanying drawings.

Figure 1 is a perspective view of a scraper or grader having my improvements applied thereto, the nearer side piece being removed. Fig. 2 is a perspective view of another form of scraper having my invention applied to it. Fig. 3 is a side view of the scraper shown in Fig. 1 when in position for dumping. Fig. 4 is a top view, enlarged, of a portion of the scraper, showing the ear by which the draft devices are connected to the scraper. Fig. 5 is a vertical transverse section through the draft-bars in line with the axis of rod F.

In the drawings, A represents the bottom and curved back of the scraper; B B, the side pieces, and C C the handles.

As my invention is applicable to scrapers of different constructions, I do not wish to be limited to any particular form or construction of these parts, but have shown, to better illustrate the invention, two styles of scrapers.

I have invented and shown in the drawings a peculiar draft device, which possesses marked advantages in causing the scraper to run steadily, in adapting it for use in ditches or other excavations, where it is desired that the team should remain on the surface of the ground while the scraper travels along the bottom of the excavation, and in overcoming any tendency to warp or twist the scraper, which arises when a U-shaped bail or a chain is attached to the sides of the scraper.

D D represent draft bars or rods bowed or curved at their rear ends, as at $d$, in such manner that their forwardly-projecting portions lie above their pivotal connection with the scraper. To the forward ends of these bars are attached the ends of the draft-chain or draft-bail E, either of which may be used; although I prefer to use a substantially V-shaped bail, such as shown, having an eye, $e$, at its forward end. In order to prevent the draft upon the forward ends of the draft-bars from drawing them toward each other, and thus causing them to bind at their hinging-points with the scraper, and also tending to crush in the sides of or warp the scraper out of shape, I interpose between the ends of the bars a rigid brace, which in this case I have shown as consisting of a bar, F, that not only prevents the draft-bars from approaching, thus insuring that the draft shall be applied to the scraper on lines parallel with its sides, but also serves as a pivot to unite the bail E with the bars. The ends of this bar are formed with portions of reduced diameter, leaving shoulders against which the perforated rear ends of the bail rest, with the front ends of the draft-bars outside of the bail ends, so that the bail and the body of the scraper can both be folded in between the draft-bars. Whiffletrees may be attached by a clevis to the eye of the bail; but when the scraper is being used in an excavation of considerable depth, where it is desirable that the team should travel on the bank, I prefer to use a chain, which may be varied in length as the depth of the excavation may require.

The cutting-edge $a$ of the scraper is extended beyond the sides B, as at $a'$, so as to clear away or pulverize the soil in front of the pivots of the bars D and the ears G, which would otherwise have to cut or force their way through the hard soil. In a construction such as shown in Fig. 1 the cutting-edge and the extended portions $a'$ thereof are formed from the same piece of metal as the bottom and back A, steel being preferably employed. In a construction like that in Fig. 2 the cutting-edge may be formed from a strip of metal separate from the body of the scraper, which latter may be formed of wood having metallic runners I.

G G are ears attached to the side pieces, B, near the pivotal connections with the draft-bars, they serving to strengthen the sides and to prevent the pivot-bolts from being torn or broken out. These ears are recessed on their inner rear faces to form seats $g$ between them and the walls B of the scraper, in which spaces or seats $g$ the rear ends of the bars D are placed, it being necessary that the slots should extend to the rear edge of the ears in order to permit the scraper to be turned into the position shown in Fig. 3 for dumping.

H H are stops projecting outward from the sides of the machine and being arranged to engage with the draft-bars, when the scraper is turned for dumping, to prevent its turning too far forward. These stops are formed from the same plate or sheet of metal as are the bottom and back A, as shown in Fig. 1.

The bars D are pivoted low down at points as near the cutting-edge a as is found convenient, as thereby the most satisfactory results are obtained.

I am aware that Patent No. 210,726 shows a scraper having a chain attached by its ends to the body and extending forward to receive the whiffletrees, with a stretcher-bar to spread apart to two lines, and that draft-bars, each made of a continuous piece of metal, have been pivoted to the body, with a brace-bar serving to keep them parallel to each other, and hence I do not claim either of such constructions; but my scraper possesses a marked advantage over any prior one of which I have knowledge. It will be seen that by the use of my draft-bars and bail the direction of movement of the scraper can be modified by the direction of travel of the team much more effectively than would be possible with a chain arranged as above referred to, while at the same time the pivots permit the draft-bars and bail to be folded up upon or against the body closely, so as to make a comparatively small and compact package for transportation or storage, the brace-bar serving to keep the outer ends of the draft-bars so far apart that the body can fold in between them, with the bail also folded in between the draft-bars.

What I claim is—

1. In a scraper, the combination, with the body, of the draft bars, the bail, and the brace-bar F, provided at its ends with the reduced portions, which serve as pivots to connect the bail with the bars, substantially as set forth.

2. In a scraper, the combination, with the parallel pivoted draft-bars, of the body provided with stops formed integral with the body and projecting laterally therefrom to engage with the draft-bars when the body is inverted, substantially as set forth.

3. A scraper having draft devices pivoted to its sides, and having also its cutting-edge extended laterally in front of the pivots of the draft devices, substantially as set forth.

4. In a scraper, the combination, with the body and the draft-bars, of the ears G, recessed, as at g, upon their rear inner faces, whereby there are formed rearwardly-opening seats for the draft-bars, substantially as set forth.

5. A scraper having the bottom and back formed from a single piece of metal, and having the laterally-projecting cutting-edges a' also formed from the same piece of metal, substantially as set forth.

6. A scraper having the bottom and back formed from a single piece of metal, and having laterally-projecting stops H H also formed from the same piece of metal, substantially as set forth.

In testimony whereof I affix my signature in presence of two witnesses.

JOSEPH C. PEQUINOT.

Witnesses:
FRANK. JOLY,
FRANK VEITH.